US011616375B2

(12) United States Patent
Nysen

(10) Patent No.: US 11,616,375 B2
(45) Date of Patent: Mar. 28, 2023

(54) RECHARGEABLE BATTERY SYSTEMS AND RECHARGEABLE BATTERY SYSTEM OPERATIONAL METHODS

(71) Applicant: Lithion Battery Inc., Henderson, NV (US)

(72) Inventor: Peter Nysen, San Jose, CA (US)

(73) Assignee: Lithion Battery Inc., Henderson, NV (US)

( * ) Notice: Subject to any disclaimer, the term of this patent is extended or adjusted under 35 U.S.C. 154(b) by 0 days.

(21) Appl. No.: 17/153,410

(22) Filed: Jan. 20, 2021

(65) Prior Publication Data

US 2021/0391729 A1 Dec. 16, 2021

Related U.S. Application Data

(60) Continuation of application No. 16/040,303, filed on Jul. 19, 2018, now Pat. No. 10,903,661, which is a continuation of application No. 14/615,189, filed on Feb. 5, 2015, now Pat. No. 10,056,764, which is a division of application No. 13/010,733, filed on Jan. 20, 2011, now Pat. No. 8,957,624.

(51) Int. Cl.
*H02J 7/00* (2006.01)
*H02J 7/34* (2006.01)
*H01M 10/44* (2006.01)

(52) U.S. Cl.
CPC ......... *H02J 7/0014* (2013.01); *H01M 10/441* (2013.01); *H02J 7/0016* (2013.01); *H02J 7/342* (2020.01); *H02J 7/345* (2013.01); *H02J 7/0018* (2013.01)

(58) Field of Classification Search
CPC ...... H02J 7/0014; H02J 7/0016; H02J 7/0018; H02J 7/342; H02J 7/345; H01M 10/441
USPC ................................. 320/103, 118, 120, 163
See application file for complete search history.

(56) References Cited

U.S. PATENT DOCUMENTS

| | | |
|---|---|---|
| 5,646,504 A | 7/1997 | Feldstein |
| 5,764,027 A | 6/1998 | Harvey |
| 5,773,959 A | 6/1998 | Merritt |
| 5,920,179 A | 7/1999 | Pedicini |
| 5,952,815 A | 9/1999 | Rouillard |

(Continued)

FOREIGN PATENT DOCUMENTS

| | | |
|---|---|---|
| CN | 1367565 | 9/2002 |
| CN | 1949559 | 4/2007 |

(Continued)

*Primary Examiner* — Edward Tso
*Assistant Examiner* — Aaron Piggush
(74) *Attorney, Agent, or Firm* — Nixon Peabody LLP; David F. Crosby

(57) ABSTRACT

Rechargeable battery systems and rechargeable battery system operational methods are described. According to one aspect, a rechargeable battery system includes a plurality of rechargeable battery cells coupled between a plurality of terminals and charge shuttling circuitry configured to couple with and shuttle electrical energy between individual ones of the rechargeable battery cells, and wherein the charge shuttling circuitry is configured to receive the electrical energy from one of the rechargeable battery cells at a first voltage and to provide the electrical energy to another of the rechargeable battery cells at a second voltage greater than the first voltage.

19 Claims, 8 Drawing Sheets

(56) References Cited

U.S. PATENT DOCUMENTS

| | | |
|---|---|---|
| 5,982,143 A | 11/1999 | Stuart |
| 6,285,161 B1 | 9/2001 | Popescu |
| 7,378,818 B2 | 5/2008 | Fowler |
| 7,400,114 B2 | 7/2008 | Anzawa |
| 7,417,405 B2 | 8/2008 | Carrier |
| 7,557,539 B2 | 7/2009 | Takagi |
| 7,564,216 B2 | 7/2009 | Carrier |
| 7,772,799 B2 | 8/2010 | Wu |
| 7,880,435 B2 | 2/2011 | Ibrahim |
| 7,973,514 B2 | 7/2011 | Gong |
| 7,973,515 B2 | 7/2011 | Densham |
| 8,111,038 B2 | 2/2012 | Wang |
| 8,120,322 B2 | 2/2012 | Lee |
| 8,222,870 B2 | 7/2012 | Guo |
| 8,350,529 B2 | 1/2013 | Loncarevic |
| 8,773,068 B2 | 7/2014 | Nysen |
| 8,922,167 B2 | 12/2014 | Nysen |
| 8,957,624 B2 | 2/2015 | Nysen |
| 9,912,178 B2 | 3/2018 | Nysen |
| 10,056,764 B2 | 8/2018 | Nysen |
| 10,903,661 B2 * | 1/2021 | Nysen ............ H02J 7/345 |
| 2002/0017895 A1 | 2/2002 | Kawashima |
| 2004/0135544 A1 | 7/2004 | Fowler |
| 2004/0135545 A1 | 7/2004 | Fowler |
| 2004/0135546 A1 | 7/2004 | Fowler |
| 2004/0257042 A1 | 12/2004 | Liu |
| 2005/0269988 A1 | 12/2005 | Thrap |
| 2006/0022639 A1 | 2/2006 | Moore |
| 2006/0071643 A1 | 4/2006 | Carrier |
| 2006/0097698 A1 | 5/2006 | Plett |
| 2006/0139004 A1 | 6/2006 | Uesugi |
| 2006/0214636 A1 * | 9/2006 | Arai ............ H01M 10/482 307/10.1 |
| 2006/0255769 A1 | 11/2006 | Liu |
| 2007/0075681 A1 | 4/2007 | Takagi |
| 2007/0080662 A1 * | 4/2007 | Wu ............ H01M 10/613 320/110 |
| 2007/0090798 A1 | 4/2007 | Yun |
| 2008/0185995 A1 | 8/2008 | Carrier |
| 2008/0191663 A1 | 8/2008 | Fowler |
| 2008/0218127 A1 | 9/2008 | Kao |
| 2008/0218130 A1 | 9/2008 | Guo |
| 2008/0272739 A1 | 11/2008 | Carrier |
| 2009/0001937 A1 | 1/2009 | Densham |
| 2009/0079390 A1 | 3/2009 | Choi |
| 2009/0091293 A1 | 4/2009 | Wang |
| 2009/0091294 A1 | 4/2009 | Gong |
| 2010/0019724 A1 | 1/2010 | Mizutani |
| 2010/0033128 A1 * | 2/2010 | Densham ............ H02J 7/0016 320/116 |
| 2010/0052615 A1 | 3/2010 | Loncarevic |
| 2010/0109608 A1 | 5/2010 | Buono |
| 2010/0148726 A1 | 6/2010 | Lee |
| 2010/0194339 A1 | 8/2010 | Yang |
| 2010/0237830 A1 | 9/2010 | Castelaz |
| 2011/0006731 A1 | 1/2011 | Wang |
| 2011/0204722 A1 | 8/2011 | Kim |
| 2012/0187898 A1 | 7/2012 | Nysen |
| 2012/0187907 A1 | 7/2012 | Nysen |
| 2012/0187909 A1 | 7/2012 | Nysen |
| 2013/0207613 A1 | 8/2013 | Loncarevic |
| 2014/0320088 A1 | 10/2014 | Nysen |
| 2015/0155721 A1 | 6/2015 | Nysen |

FOREIGN PATENT DOCUMENTS

| | | |
|---|---|---|
| CN | 101207276 | 6/2008 |
| CN | 101362427 | 2/2009 |
| CN | 101471460 | 7/2009 |
| CN | 101604860 | 12/2009 |
| CN | 101615810 | 12/2009 |
| CN | 101636892 | 1/2010 |
| CN | 201584799 | 9/2010 |
| CN | 101860049 | 10/2010 |
| EP | 2148384 | 1/2010 |
| JP | H08-213055 | 8/1996 |
| JP | 2000-270483 | 9/2000 |
| JP | 2001-095169 | 4/2001 |
| JP | 2001-136669 | 5/2001 |
| JP | 2002-233069 | 8/2002 |
| JP | 2005-137090 | 5/2005 |
| JP | 2005-253289 | 9/2005 |
| JP | 2006-246646 | 9/2006 |
| JP | 11-098698 | 4/2009 |
| JP | 2009-159768 | 7/2009 |
| JP | 2009-178040 | 8/2009 |
| JP | 2009-213196 | 9/2009 |
| JP | 2010-088194 | 4/2010 |
| JP | 2010-187534 | 8/2010 |
| KR | 10-2006-0078967 | 7/2006 |
| KR | 10-2008-0074581 | 8/2008 |
| KR | 10-2009-0092890 | 9/2009 |
| KR | 10-2010-0136769 | 12/2010 |
| WO | WO 2006/041751 | 4/2006 |
| WO | WO 2010/076955 | 7/2010 |

* cited by examiner

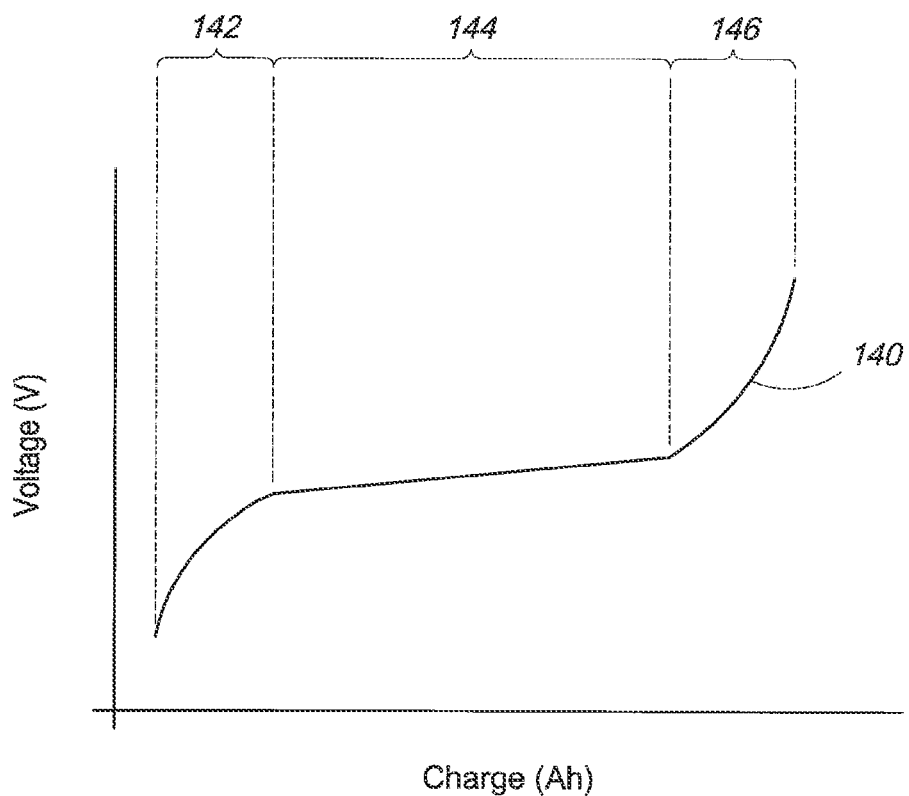

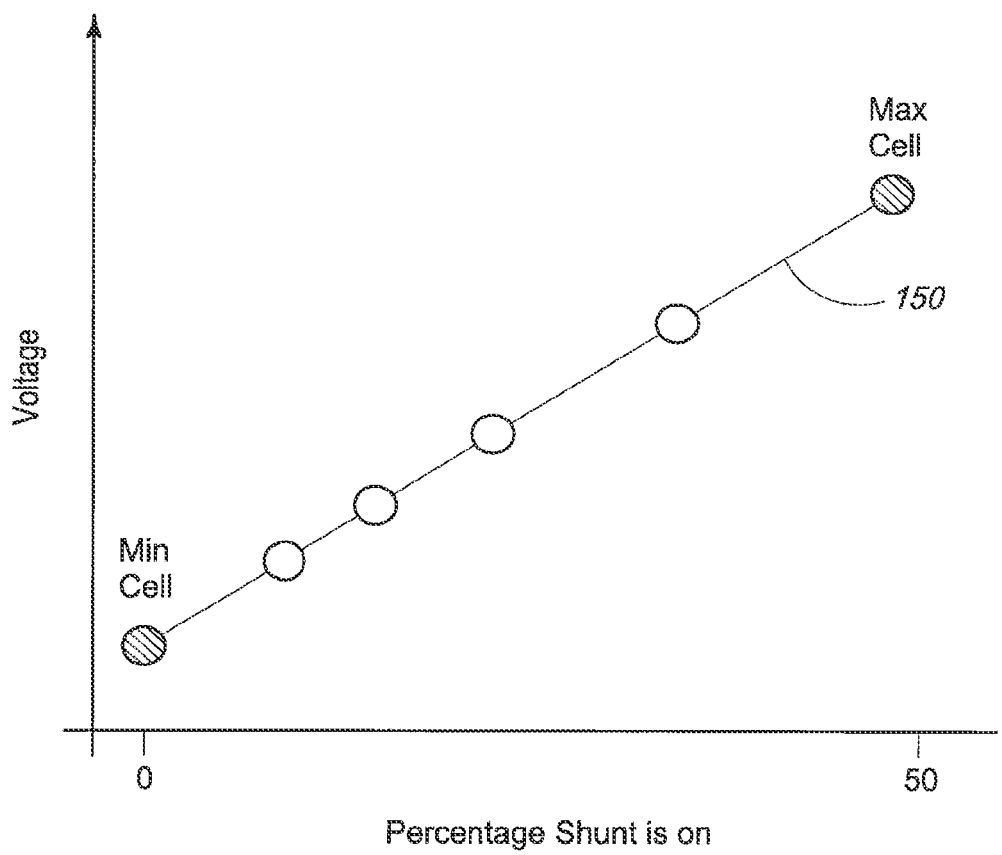

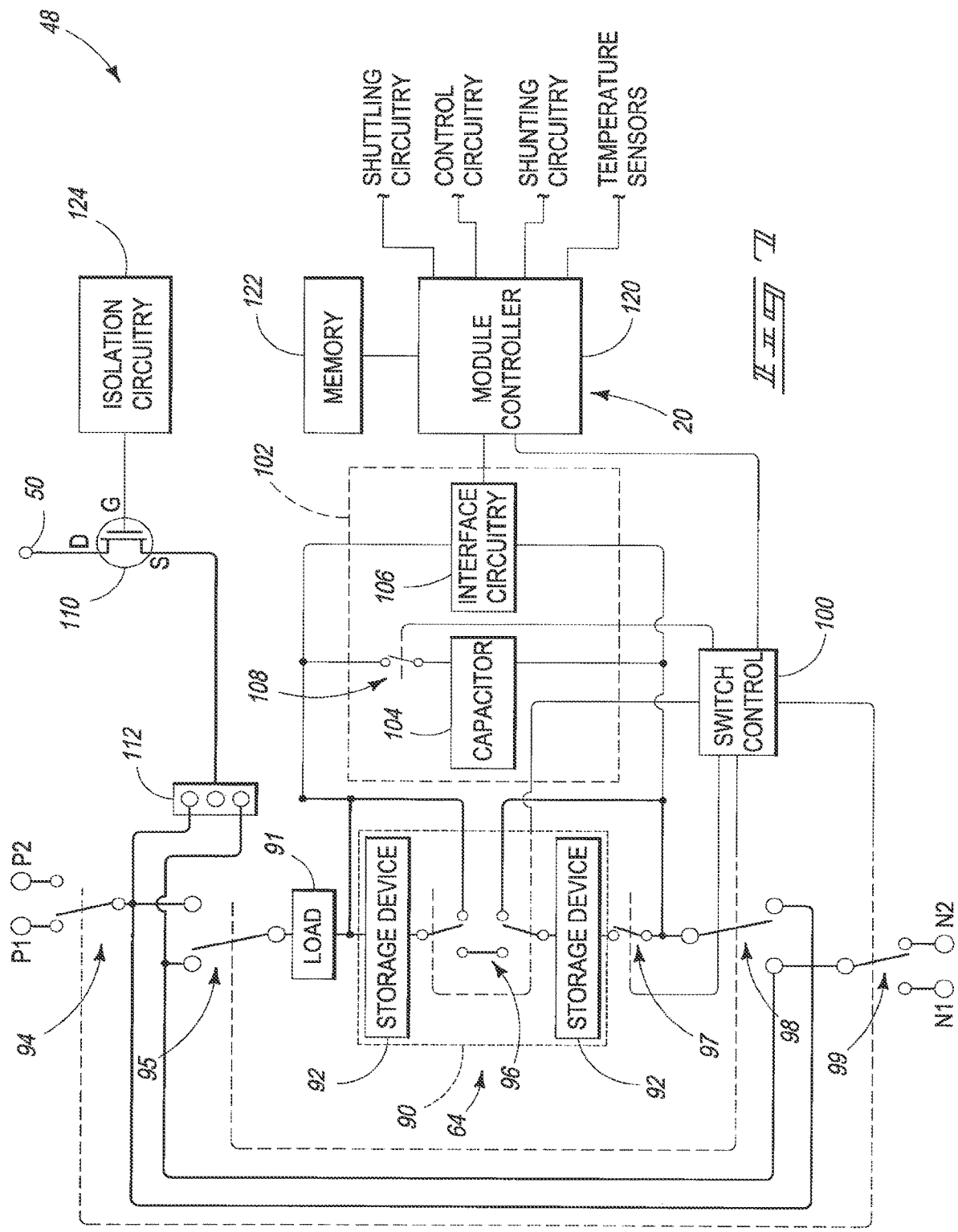

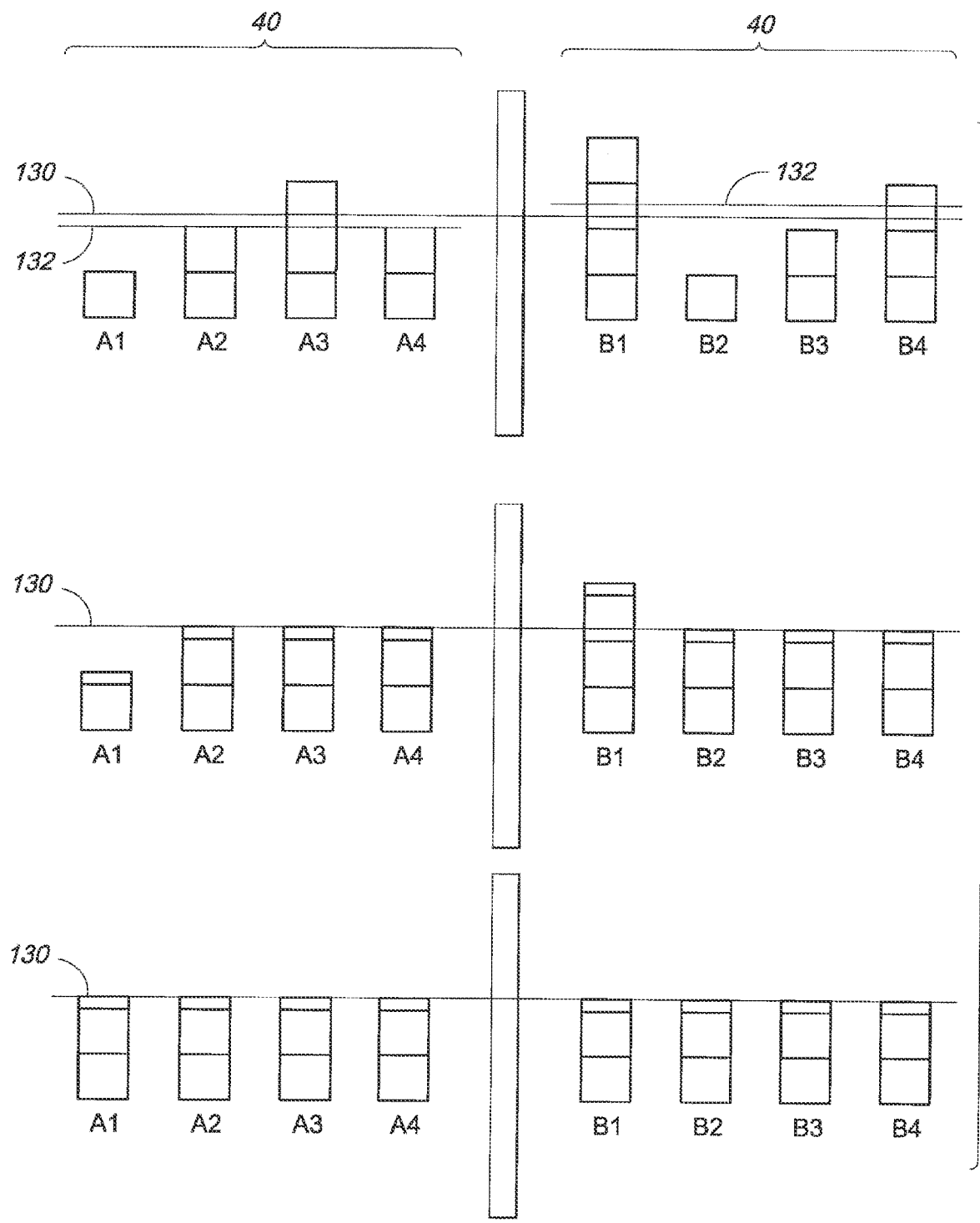

RECHARGEABLE BATTERY SYSTEMS AND RECHARGEABLE BATTERY SYSTEM OPERATIONAL METHODS

TECHNICAL FIELD

This disclosure relates to rechargeable battery systems and rechargeable battery system operational methods.

BACKGROUND OF THE DISCLOSURE

Rechargeable batteries are being designed for and used in varied applications with different requirements for electrical energy. The rechargeable battery systems comprise rechargeable cells which receive electrical energy during charging operations and supply electrical energy to a load during discharging operations. Rechargeable cells may have different chemistries and may include Lithium cells in one example. The number of rechargeable cells used in different applications is varied depending upon the requirements of the load, and the number of cells may be numerous in some implementations, for example, transportation implementations.

Individual battery cells typically have an operational voltage, for example, 3.2 VDC for Lithium battery cells. Depending upon the application of use, individual battery cells may be coupled in series to provide electrical energy to a load at an appropriate voltage. Individual battery cells may also be coupled in parallel to supply a desired amount of charge capacity.

Balancing of the battery cells may be problematic due to different characteristics of the individual battery cells. In addition, a battery cell may be damaged if its voltage gets too high or too low and may fail to charge once damaged.

At least some aspects of the disclosure are directed towards rechargeable battery systems and methods.

BRIEF DESCRIPTION OF THE DRAWINGS

Exemplary embodiments of the disclosure are described below with reference to the following accompanying drawings.

FIG. 5 is a graphical representation of voltage versus charge for a rechargeable battery cell according to one embodiment.

FIG. 6 is a graphical representation of shunting of electrical energy of different rechargeable battery cells according to one embodiment.

FIG. 7 is a functional block diagram of a capacitor module according to one embodiment.

FIG. 8 is an illustrative representation of charge balancing of a plurality of cells of a plurality of rechargeable battery modules according to one embodiment.

DETAILED DESCRIPTION OF THE DISCLOSURE

Attention is directed to the following commonly assigned applications, which are incorporated herein by reference:

U.S. Patent application Ser. No. 13/010,724 entitled "Rechargeable Battery Systems And Rechargeable Battery System Operational Methods" by inventor Peter Nysen, and filed the same day as the present application; and U.S. patent application Ser. No. 13/010,733 entitled "Rechargeable Battery Systems And Rechargeable Battery System Operational Methods" by inventor Peter Nysen, and filed the same day as the present application.

According to one embodiment, a rechargeable battery system comprises a plurality of rechargeable battery cells coupled between a plurality of terminals and charge shuttling circuitry configured to couple with and shuttle electrical energy between individual ones of the rechargeable battery cells, and wherein the charge shuttling circuitry is configured to receive the electrical energy from one of the rechargeable battery cells at a first voltage and to provide the electrical energy to another of the rechargeable battery cells at a second voltage greater than the first voltage.

According to an additional embodiment, a rechargeable battery system operational method comprises transferring electrical energy from one of a plurality of rechargeable battery cells of a battery system to another of the rechargeable battery cells to increase balancing of the states of charge of the rechargeable battery cells with respect to one another compared with the states of charge of the rechargeable battery cells in an absence of the transferring and wherein the transferring comprising receiving the electrical energy from the one of the rechargeable battery cells at a first voltage and providing the electrical energy to the another of the rechargeable battery cells at a second voltage greater than the first voltage.

According to another additional embodiment, a rechargeable battery system comprises a plurality of rechargeable battery cells coupled between a plurality of terminals, shunting circuitry configured to shunt charging electrical energy around at least one of the rechargeable battery cells, and charge shuttling circuitry configured to couple with and shuttle electrical energy from a first of the rechargeable battery cells to a second of the rechargeable battery cells.

According to yet another embodiment, a rechargeable battery system operational method comprises charging a plurality of rechargeable battery cells, shunting charging electrical energy around at least one of the rechargeable battery cells during the charging, and shuttling electrical energy from a first of the rechargeable battery cells to a second of the rechargeable battery cells during the charging.

Figure 1:
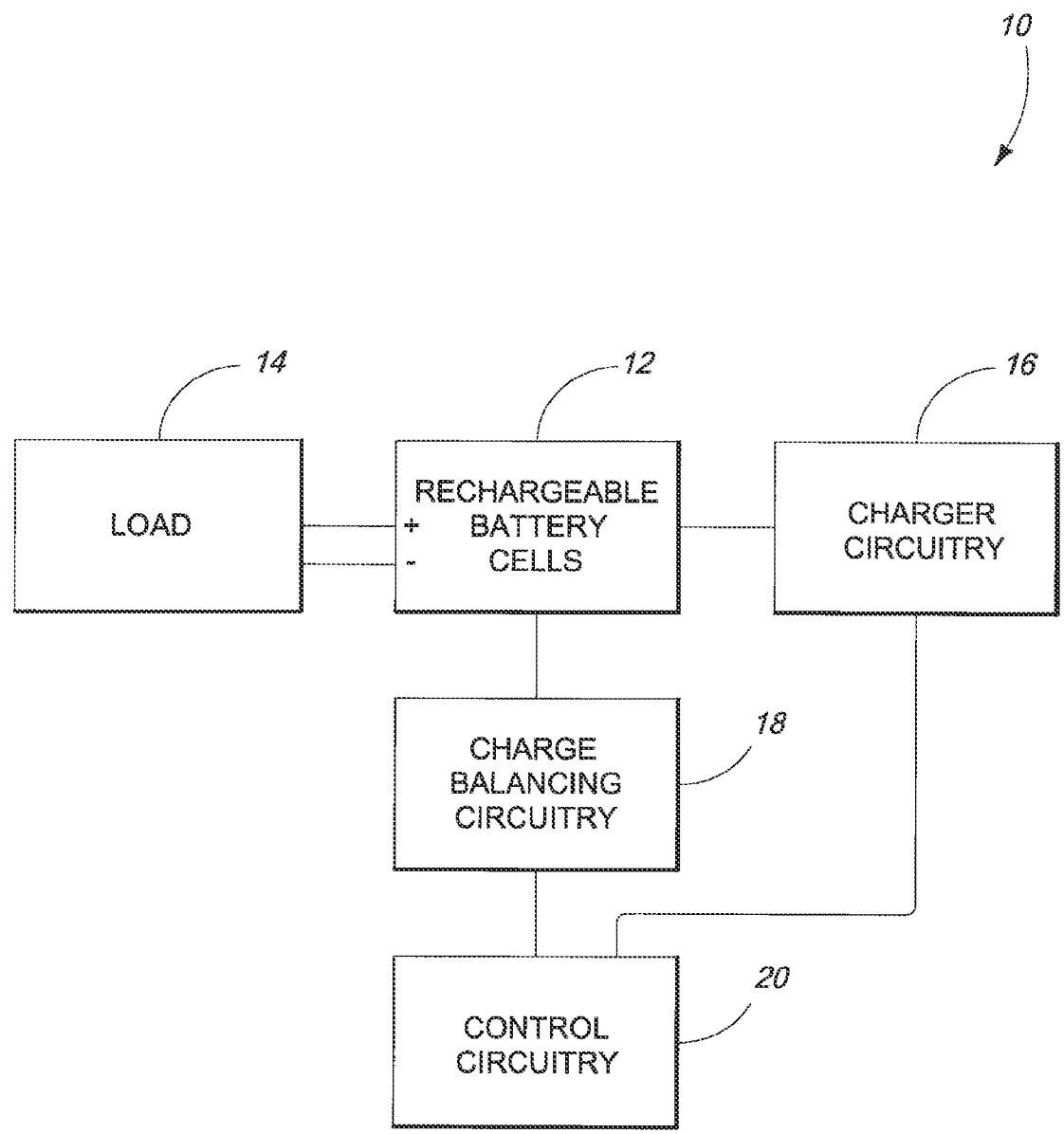
FIG. 1 is a functional block diagram of a rechargeable battery system according to one embodiment.

Referring to FIG. 1, a rechargeable battery system 10 is shown according to one embodiment. In the illustrated example, the rechargeable battery system 10 includes a plurality of rechargeable battery cells 12, charger circuitry 16, charge balancing circuitry 18 and control circuitry 20. Other embodiments are possible including more, less and/or alternative components.

Rechargeable battery cells 12 are configured to store electrical energy which may be used to power load 14 during discharge operations of battery system 10. In one embodiment, rechargeable battery cells 12 include Lithium cells. Rechargeable battery cells 12 may be arranged in a pack including different series and/or parallel arrangements in different configurations for use in powering different loads 14 having different power requirements. In some embodiments described below, rechargeable battery cells 12 may be implemented within a plurality of modules.

Charger circuitry 16 is configured to supply charging electrical energy to rechargeable battery cells 12 during charging operations of battery system 10. Charger circuitry 16 may provide the charging electrical energy from any suitable source, such as AC mains, solar, fossil fuels, water, or wind in some examples.

Charge balancing circuitry 18 is configured to implement operations in an effort to increase balancing of states of charge of rechargeable cells 12. In some example embodiments described below, charge balancing circuitry 18 includes charge shunting circuitry configured to shunt charging electrical energy around selected ones of the rechargeable cells 12 having states of charge greater than others of the rechargeable cells 12. Charge balancing circuitry 18 may include charge shuttling circuitry in some embodiments. Charge shuttling circuitry of the charge balancing circuitry 18 is configured to shuttle electrical energy between selected ones of the rechargeable cells 12 as described in detail below.

Control circuitry 20 is configured to monitor and control operations of battery system 10. For example, control circuitry 20 may monitor states of charge of the rechargeable battery cells 12 and control operations of charger circuitry 16 and charge balancing circuitry 18 as a result of the monitoring.

Control circuitry 20 may comprise circuitry configured to implement desired programming provided by appropriate media in at least one embodiment. For example, the control circuitry 20 may be implemented as one or more of a processor and/or other structure configured to execute executable instructions including, for example, software and/or firmware instructions, and/or hardware circuitry. As described below according to some example embodiments, control circuitry 20 includes a system controller 21 and a plurality of module controllers 120. Exemplary embodiments of control circuitry 20 include hardware logic, PGA, FPGA, ASIC, state machines, and/or other structures alone or in combination with a processor. These examples of control circuitry 20 are for illustration and other configurations are possible.

Control circuitry 20 may include or otherwise access storage circuitry (not shown) which is configured to store programming such as executable code or instructions (e.g., software and/or firmware), electronic data, databases, state of charge information, thresholds, or other digital information and may include processor-usable media. Processor-usable media may be embodied in any computer program product(s) or article of manufacture(s) which can contain, store, or maintain programming, data and/or digital information for use by or in connection with an instruction execution system including control circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry described above and configured to control appropriate control circuitry 20. For example, programming may be provided via appropriate articles of manufacture including, for example, embodied within media discussed above.

Figure 2:
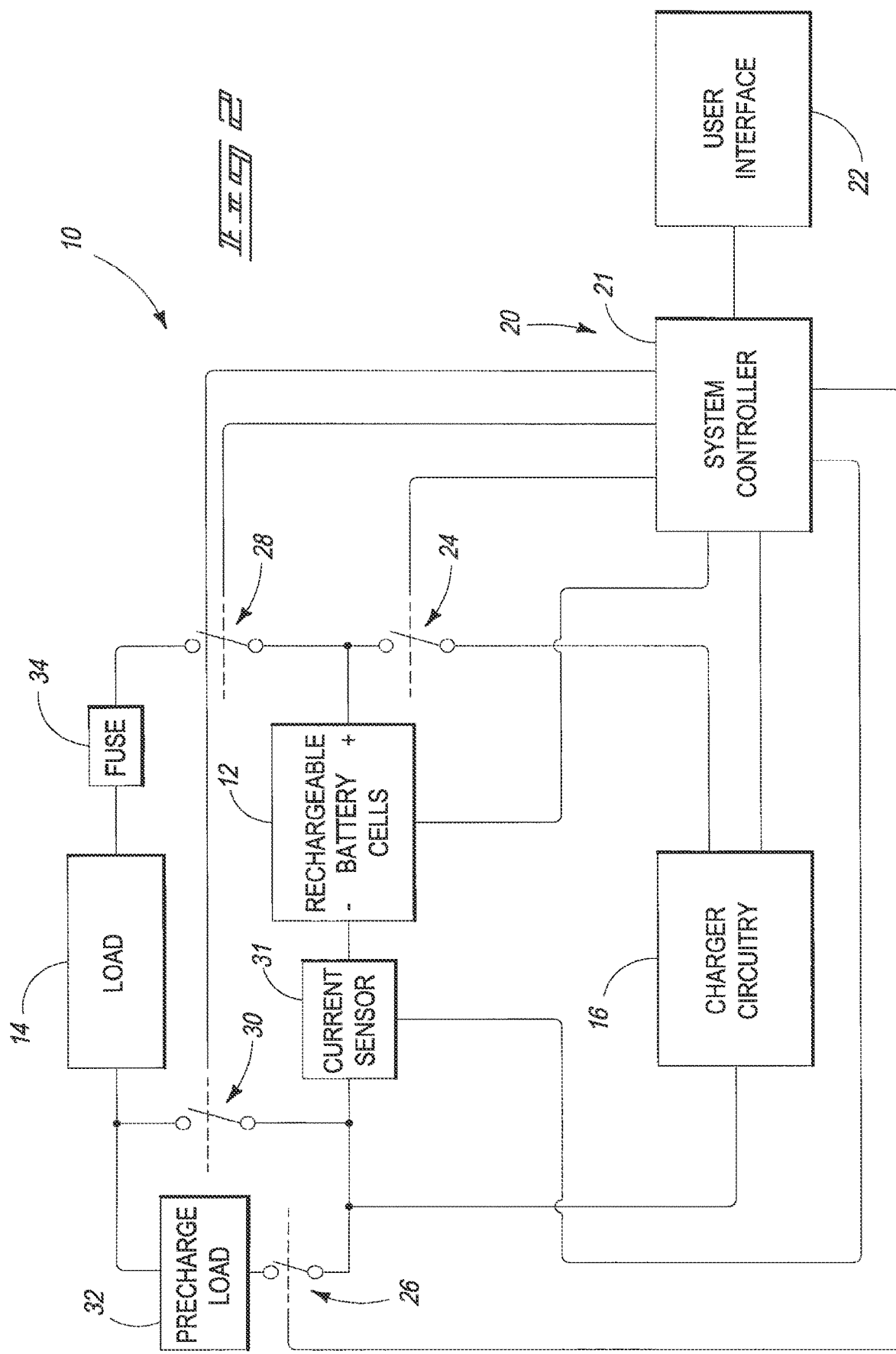
FIG. 2 is a functional block diagram of a rechargeable battery system according to one embodiment.

Referring to FIG. 2, one embodiment of rechargeable battery system 10 is shown in additional detail. In the depicted embodiment, rechargeable battery cells 12 are arranged in an appropriate pack to provide electrical energy to power load 14.

Control circuitry 12 includes a system controller 21 which provides monitoring and control of battery system 12 at a system level. System controller 21 may communicate with a plurality of module controllers 120 (described below with respect to FIG. 7) of a plurality of rechargeable battery modules in one embodiment. System controller 21 is configured to monitor an amount of electrical energy provided from rechargeable battery cells 12 to load 14 and/or provided from charger circuitry 16 to cells 12 via current sensor 31 in the illustrated embodiment. Furthermore, system controller 21 controls a plurality of switches 24, 26, 28, 30 described below.

User interface 22 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface may include a display (e.g., cathode ray tube, LCD, etc.) configured to depict visual information and an audio system as well as a keyboard, mouse and/or other input device. Any other suitable apparatus for interacting with a user may also be utilized. A user may input instructions and monitor operations of battery system 10 via user interface 22 in one embodiment.

In one embodiment, system controller 21 is configured to control charging operations of the rechargeable battery cells 12. System controller 21 may control a switch (e.g., charging relay) 24 to selectively couple the charger circuitry 16 with the positive terminal of the pack of the rechargeable battery cells 12 at appropriate moments in time to charge the rechargeable battery cells 12. Charger circuitry 16 may be implemented as a programmable power supply which may be voltage or current controlled in example embodiments.

In the depicted embodiment, battery system 10 also includes a switch (e.g., precharge relay) 26 and positive and negative switches (e.g., high power relays) 28, 30. Initially, the load 14 is isolated from the pack of rechargeable battery cells 12 by switches 26, 28, 30 during coupling of load 14 with the rechargeable battery system 10. Following coupling of load 14 with the rechargeable battery system 10, the switches 26, 28 may be initially closed by system controller 21 to protect the battery system 10 from large current spikes. For example, switch 26 is coupled with an appropriate precharge load 32, such as an appropriate resistive load, to prevent in-rush of excessive current to load 14. Thereafter, the switch 30 may be closed to fully couple the load 14 with the pack of rechargeable battery cells 12. An appropriate fuse 34 may also be used to protect rechargeable battery system 10 from short circuits and other faults in load 14.

Figure 3:
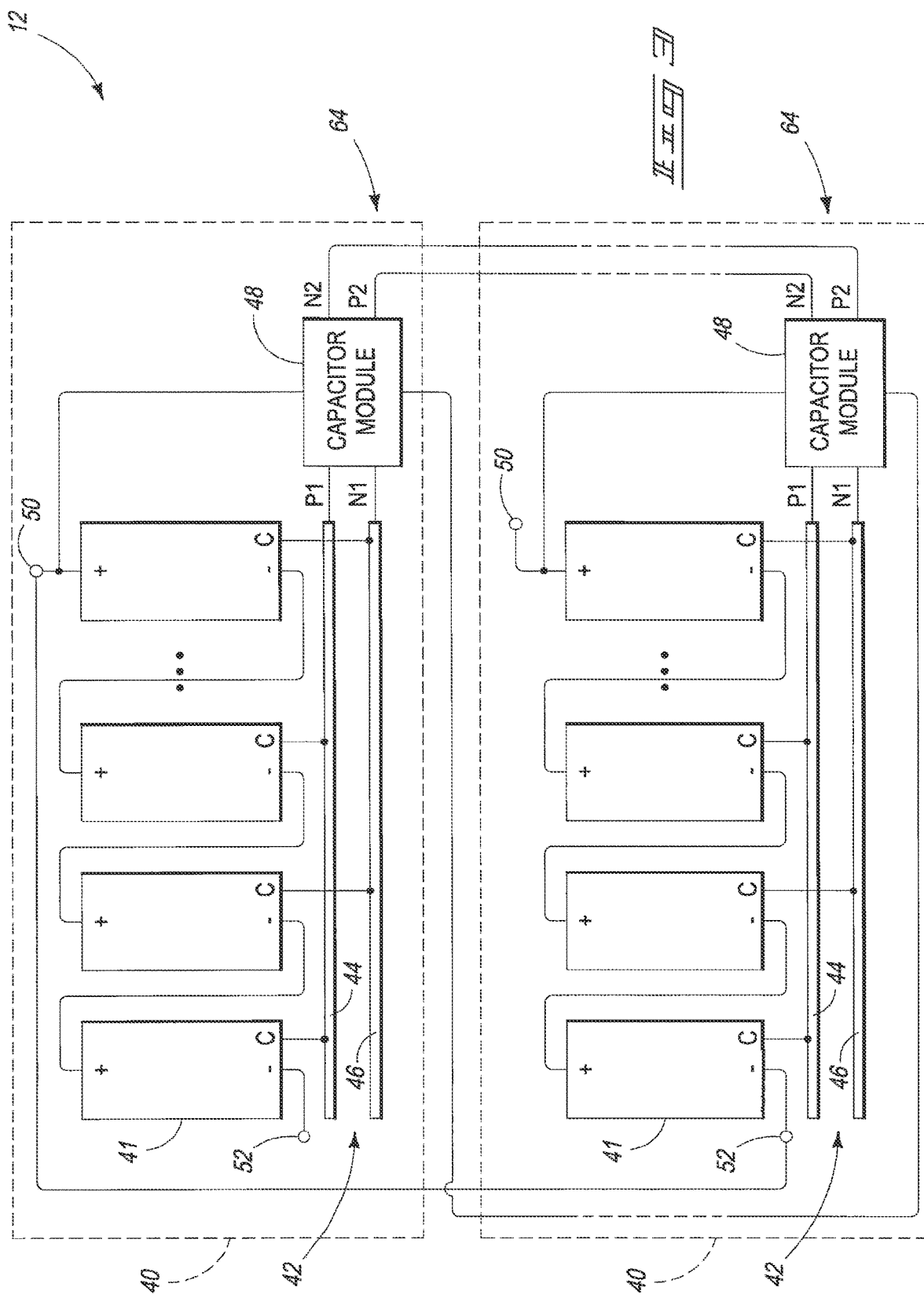
FIG. 3 is an illustrative representation of a plurality of rechargeable battery modules according to one embodiment.

Referring to FIG. 3, a plurality of rechargeable battery modules 40 of battery system 10 are shown in one embodiment.

In the depicted embodiment, each of the rechargeable battery modules 40 includes a positive terminal 50 and negative terminal 52 and the rechargeable battery modules 40 are coupled in series. The positive terminal 50 of the lower module 40 is the positive terminal of the pack of the rechargeable battery cells 12 which may be coupled with the load 14 while the negative terminal of the upper module 40 is the negative terminal of the pack of the rechargeable battery cells 12 which may be coupled with the load 14. In addition, the positive terminal 50 of the upper module 40 and the negative terminal 52 of the lower module 40 are coupled with one another to provide the series coupling of the modules 40 in the illustrated example. Additional rechargeable battery modules 40 may be provided in the rechargeable battery pack in other examples of the battery system 10. Furthermore, the rechargeable battery cells 12 may be implemented in a pack without modules 40 in other embodiments.

Individual ones of the rechargeable battery modules 40 include a plurality of rechargeable cell modules 41 which are described below in additional detail in the example of FIG. 4. Each rechargeable cell module 41 may include a rechargeable battery cell 12 coupled intermediate a plurality of terminals of the rechargeable cell module 41. In addition, the rechargeable cell modules 41 of a module 40 are coupled in series intermediate module terminals 50, 52. Although four rechargeable cell modules 41 are coupled in series in the illustrated examples of rechargeable battery module 40, rechargeable battery modules 40 may include more or less cell modules 41 in other embodiments.

Figure 4:
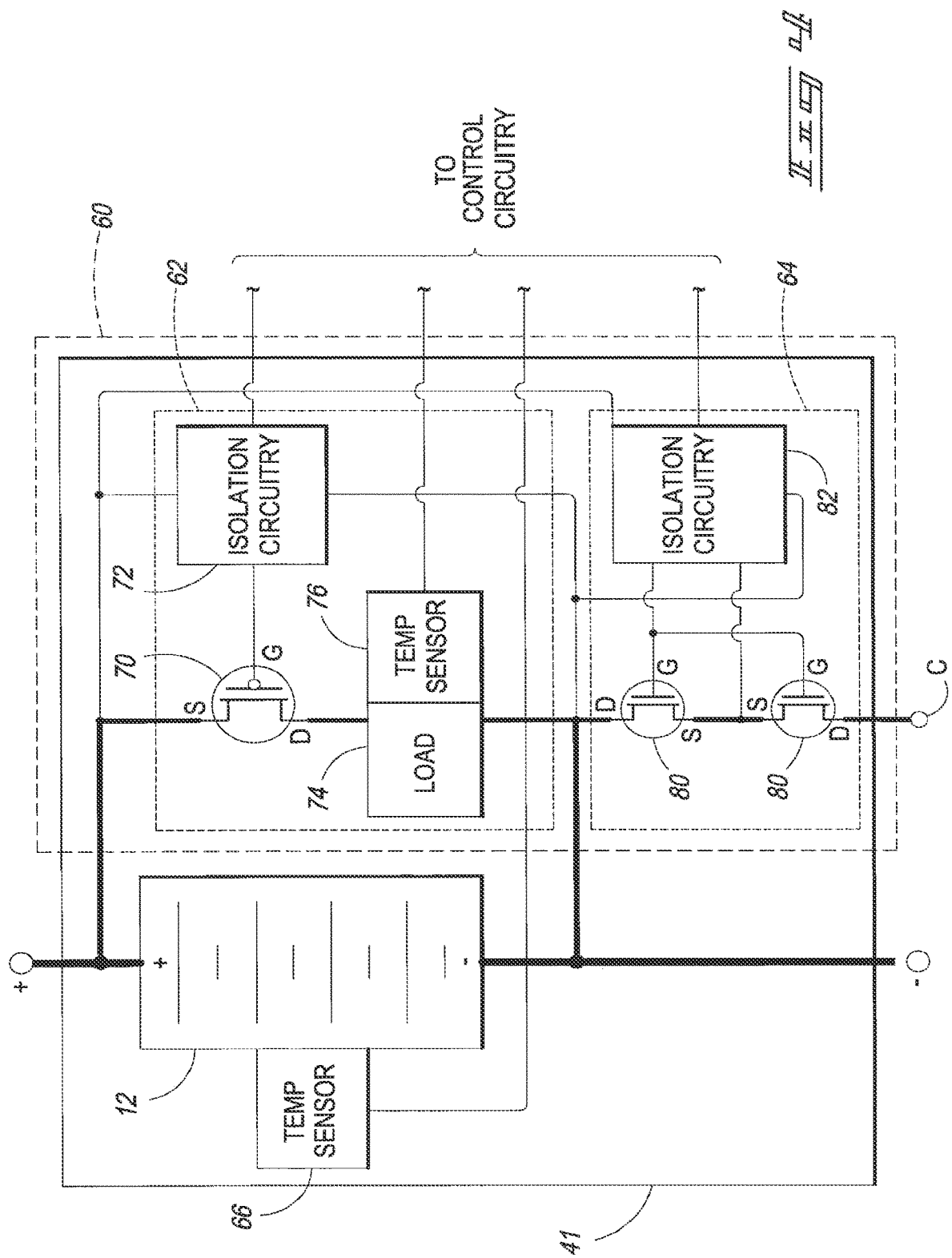
FIG. 4 is an illustrative representation of a rechargeable cell module according to one embodiment.

Each of the rechargeable cell modules 41 also includes a capacitor terminal labeled "C" in FIGS. 3 and 4. The capacitor terminals of the rechargeable cell modules 41 are alternatively coupled with a positive capacitor terminal 44 and a negative capacitor terminal 46 of a capacitor bus 42 of the respective rechargeable battery module 40. The positive and negative capacitor terminals 44, 46 of capacitor bus 42 are coupled with respective terminals P1, N1 of a capacitor module 48 in a respective rechargeable battery module 40. The capacitor bus 42 and capacitor module 48 may be a part of charge shuttling circuitry 64 described below in one embodiment. Charge shuttling circuitry 64 is configured to shuttle electrical energy from one of the rechargeable cell modules 41 to another of the rechargeable cell modules 41 and/or between rechargeable battery modules 40 in one embodiment. The capacitor modules 48 of rechargeable battery modules 40 may be coupled with one another in parallel via respective terminals P2, N2 in one embodiment.

Referring to FIG. 4, one embodiment of a rechargeable cell module 41 is shown. The example embodiment of the rechargeable cell module 41 shown in FIG. 4 includes a rechargeable battery cell 12 coupled with positive and negative terminals of the cell module 41. The illustrated rechargeable cell module 41 also includes a temperature sensor 66 which may be coupled with a module controller of the control circuitry 20 described below (e.g., module controller 120 of FIG. 7). Temperature sensor 66 provides signals regarding the temperature of rechargeable battery cell 12 in the illustrated embodiment. In one embodiment, control circuitry 20 may provide a system shutdown of battery system 10 if a temperature of a rechargeable battery cell 12 goes below or above a desired operational range where the cell 12 may be damaged. In one example where the rechargeable battery cell 12 comprises Lithium, it is desired to maintain the cell within temperature ranges of 0 to 45° C. during charging, −10 to 50° C. during discharging, and −40 to 50° C. during storage. Furthermore, control circuitry 20 may also utilize information regarding the temperature of cell 12 to determine the state of charge of the cell 12 inasmuch as perceived state of charge may vary with the temperature of the cell 12 in some cell configurations.

The rechargeable cell module 41 also includes charge balancing circuitry 60 which includes shunting circuitry 62 and charge shuttling circuitry 64 in the illustrated embodiment. Charge balancing circuitry 60 attempts to balance the states of charge of the rechargeable battery cells 12 (i.e., provide the cells 12 having substantially the same state of charge) of the rechargeable battery modules 40 during operations of the battery system 12.

As mentioned above with respect to some embodiments, rechargeable battery cells 12 may be implemented as Lithium cells. Accordingly, it is desired to avoid one or more of the rechargeable battery cells 12 having a voltage above or below operational threshold voltages which may damage the cell 12 in some embodiments. It is desired to provide the rechargeable battery cells 12 having substantially balanced (i.e., the same) states of charge during charging and discharging operations of the battery system 10 which may result in an increase of the rate at which the battery system 10 is charged to full capacity while maximizing an amount of energy extracted from the pack of rechargeable battery cells 12 during discharge operations as described further below.

Shunting circuitry 62 and shuttling circuitry 64 may be selectively enabled and disabled responsive to control of a respective module controller of the control circuitry 20 in one embodiment in attempts to balance the states of charge of the rechargeable battery cells 12. Shunting circuitry 62 is configured to shunt charging electrical energy from charger circuitry 16 around the rechargeable battery cell 12 in the illustrated embodiment. Charge shuttling circuitry 64 is configured to provide electrical energy to the rechargeable battery cell 12 or remove electrical energy from cell 12 during charge shuttling operations as described in further detail below.

Example operations of shunting circuitry 62 are also described below. As mentioned above, shunting circuitry 62 is configured to selectively shunt charging electrical energy around rechargeable battery cell 12. During charging operations, the rechargeable battery cells 12 in a battery module 40 may charge at different rates, for example, due to different characteristics, such as different internal resistances resulting from manufacture of the rechargeable battery cells 12. Accordingly, one or more of the rechargeable battery cells 12 may charge faster than others of the cells 12. In order to avoid overcharging a respective cell 12, the shunting circuitry 62 operates to shunt at least some or all of the charging electrical energy around the respective rechargeable battery cell 12 of the respective rechargeable cell module 41. In some embodiments, a module controller of the control circuitry 20 monitors the voltages of the rechargeable battery cells 41 of the respective module 40 and controls the shunting circuitry 62 to shunt charging electrical energy around one or more of the rechargeable battery cells 12 having states of charge higher than another of cells 12 of the module 40.

Referring to FIG. 5, a voltage versus charge graph 140 is shown for typical Lithium cells 12. Lithium cells 12 have a plurality of different operational states corresponding to different states of charge of cell 12. In the illustrated graph 140, a Lithium cell 12 has a substantially discharged state 142, an intermediate state 144 and a substantially charged state 146. The intermediate state 144 has a relatively flat voltage curve versus a relatively large portion of the different states of charge of the cell 12 while the substantially discharged and charged states 142, 146 have steeper slopes. It may be more difficult to accurately determine the state of charge of the rechargeable battery cell 12 having a voltage corresponding to the intermediate state 144 compared with the substantially charged and discharged states 142, 146 due to the relatively flat nature of graph 140 within the intermediate state 144.

Some drawbacks with shunting of the charging electrical energy are that some energy may be wasted reducing efficiency of charging operations, excessive heat, and implementing balancing operations by shunting may be relatively slow. In some arrangements, the shunting of charging electrical energy around one or more of the rechargeable battery cells 12 having the highest states of charge may be performed during all operational states 142, 144, 146 of the rechargeable battery cells 12 in an effort to increase the rate at which the cells 12 are balanced.

More specifically, in one embodiment, the control circuitry 20 monitors the states of charge of each of the rechargeable battery cells 12 of the respective module 40 during charging in all of the different operational states of the rechargeable battery cells 12 including the substantially discharged state 142, intermediate state 144 and substantially charged state 146, and controls the shunting of the charging electrical energy around individual ones of the rechargeable battery cells 12 having higher states of charge compared with others of the cells 12 of the respective module 40 during charging in each of the different operational states 142, 144, 146 of the cells 12.

Even though the use of shunting circuitry 62 may be relatively slow to implement balancing compared with other balancing techniques, implementing of shunting operations during an entirety of a charging cycle of the rechargeable battery cells 12 of a rechargeable battery module 40 from the substantially discharged state 142 to the intermediate state 144 and the substantially charged state 146 improves the speed of the overall balancing operations since the shunting is performed over a longer period of time compared with arrangements which only implement shunting operations at the end of the charging cycle to avoid overcharging one or more rechargeable battery cells having a higher state of charge.

In one embodiment, implementing shunting operations with respect to the charging electrical energy by the shunting circuitry 62 during each of the different operational states 142, 144, 146 of the rechargeable cells 12 results in the rechargeable battery cells 12 entering the substantially charged state 146 having states of charge which are closer to one another (i.e., increased balancing) compared with arrangements where shunting is only performed when the cells are in the substantially charged state to avoid overcharge of one or more cells or shunting is not performed at all.

The implementing of shunting operations during the different operational states 142, 144, 146 of the cells 12 in accordance with one described embodiment permits shunting using reduced duty cycles (e.g., duty cycles within a range of 0-50%) compared with arrangements which only implement shunting when the cells are substantially charged. More specifically, the shunting during the plurality of operational states 142, 144, 146 enables shunting operations to occur over longer periods of time compared with arrangements which only implement shunting when the cells are substantially charged, and accordingly the duty cycles of the pulse width modulation signals may be reduced during the balancing operations of the cells 12 which assists with providing reduced temperatures in the shunting circuitry 62.

Referring again to FIG. 4, the example embodiment of the shunting circuitry 62 of an individual rechargeable battery module 41 includes a shunting device (e.g., a switch) 70, isolation circuitry 72, a load 74 and a temperature sensor 76. The module controller of control circuitry 20 may provide appropriate control signals via isolation circuitry 72 which may implement optical, transformer coupling or Galvanic isolation in example embodiments. The control signals selectively enable shunting device 70 to implement shunting operations where at least some of the charging electrical energy passes around the rechargeable battery cell 12 and through the load 74 which may be a current limiting resistor in one example. In another possible embodiment, the shunting device 70 may be implemented as a Darlington transistor and the load 74 may be omitted.

The module controller of the control circuitry 20 may monitor the temperature of the load 74 (or Darlington transistor not shown) via a temperature sensor 76 in one embodiment. The control circuitry 20 may disable shunting operations of a respective shunting device 70 if the temperature of the load 74 exceeds a threshold in one embodiment. Maximum operational temperatures of the shunting circuitry 62 may correspond to a maximum operational junction temperature of the shunting device 70 and/or a maximum operational temperature of load 74 in illustrative embodiments. Thereafter, the shunting device 70 will remain disabled until the temperature of the shunting device 70 falls below a different temperature threshold (e.g., five degrees less than the threshold which controls the disabling of the shunting operations in one example). The shunting device 70 may resume shunting operations once the temperature of the respective shunting device 70 falls below the lower temperature threshold. In some implementations, the shunting circuitry 62 may include a heat sink (not shown) to facilitate cooling of the shunting circuitry 62.

In one embodiment, the duty cycles of the pulse width modulation signals which are used to control the shunting may also be varied as a result of monitoring of the temperatures of the respective shunting circuitry 62. For example, the duty cycle of the pulse width modulation for one of the shunting circuits 62 may be reduced if the temperature of the respective shunting circuit 62 is approaching the temperature threshold. Lowering of the duty cycle should assist with reducing temperature of the shunting circuit 62.

Furthermore, the module controller may also monitor the temperature of the rechargeable battery cell 12 via temperature sensor 66 to verify that the temperature of the cell 12 is within desired threshold limits to avoid damage to cell 12 as mentioned above. The module controller may initiate a warning or perhaps shutdown charging or discharging operations with respect to a cell 12 having a temperature which exceeds the threshold in example embodiments.

As mentioned previously, the module controller of the control circuitry 20 may control shunting operations of the shunting circuitry 62 in one implementation. More specifically, the control circuitry 20 may control the shunting circuitry 62 of the different rechargeable cell modules 41 to provide different amounts of shunting of the respective cells 12 based upon the states of charge of the rechargeable battery cells 12 according to one embodiment. For example, referring to FIG. 6, a graph 150 illustrates different cells 12 of a module 40 having different states of charge at a common moment in time during a charging cycle of the rechargeable battery module 40. The shunting circuitry 62 of the rechargeable cell modules 41 with rechargeable battery cells 12 having the higher states of charge may be controlled to implement increased shunting compared with rechargeable battery cells of the module 40 having less states of charge.

In one embodiment, the module controller of the control circuitry 20 is configured to provide pulse width modulation signals to control the shunting circuitry 62 of the individual rechargeable cell modules 41. The control circuitry 20 may vary the duty cycles of the control signals for the different shunting circuits 62 of the battery cell modules 41 from 0-100% (0-50% in the example of FIG. 6) depending upon the states of charge of the respective rechargeable battery cells 12 of module 40 compared with others of the cells of the individual rechargeable battery module 40.

Increasing the duty cycle of the control signal applied to a shunting device 70 operates to increase the shunting of the charging electrical energy around the respective rechargeable battery cell 12 and reduces the rate of charging of the cell 12 compared with rates of charge of the other cells 12 being shunted using control signals having smaller duty cycles.

In one implementation, the cells 12 having the highest and lowest states of charge for a given rechargeable battery module 40 may be used to define a substantially linear slope and the cell 12 having the highest state of charge may be shunted the most (e.g., 50% duty cycle) while the cell 12 having the lowest state of charge may be shunted the least (e.g., 0% duty cycle). The pulse width modulation signals to control shunting for others of the cells 12 may be adjusted depending upon the respective states of charge of the cells 12 between the cells 12 having the minimum and maximum states of charge in one example.

In one embodiment, different ranges of duty cycles may be used to implement the shunting depending upon different states of charge of the cells 12. In one more specific example, shunting may be implemented within a duty cycle range of 0-50% for cells 12 which are in a substantially discharged state or intermediate state while a duty cycle range of 0-100% may be used for cells 12 which are in a substantially charged state.

In one embodiment, the module controller of a respective rechargeable battery module 40 may determine the appropriate pulse width modulation control signals for controlling the shunting circuitry 62 of the respective rechargeable cell modules 41 in accordance with the above.

In addition, states of charge of the cells 12 may be monitored with respect to a plurality of thresholds by the control circuitry 20 during charging of the cells 12 in one embodiment. The thresholds which are used may correspond to the type of cells 12 which are implemented in the battery system 10 in one embodiment. The control circuitry 20 may control the charging of the cells 12 differently depending upon the states of charge of the cells 12. In one embodiment, the control circuitry 20 may monitor the states of charge of individual ones of the cells 12 with respect to an initial overvoltage threshold. If all of the cells 12 of all modules 40 are below the initial overvoltage threshold, the control circuitry 20 may control the charger circuitry 16 to charge the cells 12 of the modules 40 at a maximum charging rate using maximum current.

As a result of the state of charge of a highest one of the cells 12 exceeding the initial overvoltage threshold, the control circuitry 20 may control the charger circuitry 16 to reduce a current of the charging electrical energy applied to the cells 12 of the modules 40 to be an amount less than the maximum charging current. If one of the cells 12 exceeds another overvoltage threshold which is higher than the initial overvoltage threshold, the control circuitry 20 may control the charger circuitry 16 to further reduce the current of the charging electrical energy applied to the cells 12 of the modules 40. If one of the cells 12 thereafter exceeds a fault limit threshold (which indicates a higher state of charge than the previous thresholds), the control circuitry 20 may control the charger circuitry 16 to stop providing charging electrical energy to the cells 12 of the modules 40.

In one embodiment, the control circuitry 20 may control the respective shunting circuitry 62 of the modules 41 to reduce the state of charge of the highest charged cell(s) 12 below the respective thresholds. The control circuitry 20 may control the shunting circuitry 62 to provide maximum shunting to cell(s) 12 which exceeded the fault limit threshold in one embodiment. For example, the shunting devices of the appropriate shunting circuits 62 may be shunted hard on without modulation to provide continuous maximum shunting in one embodiment. Charging may be resumed when the cell 12 which had the highest state of charge falls below the cell 12 with the lowest state of charge or a timeout has occurred in illustrative examples.

Accordingly, the shunting causes different rechargeable battery cells 12 of a battery module 40 to charge at different rates where the cells 12 having less states of charge may charge faster than the cells 12 having greater states of charge. As mentioned above, the operations of the shunting circuitry 62 of the individual rechargeable cell modules 41 during the different operational states 142, 144, 146 provides the rechargeable battery cells 12 having increased balancing during charging operations compared with arrangements where shunting is not implemented during the different operational states 142, 144, 146. In one embodiment, the shunting operations enable charging of each of the rechargeable battery cells 12 of a rechargeable battery module 40 to a completely charged state faster than charging operations which do not implement shunting operations during each of the operational states of the rechargeable battery cells 12 since the rechargeable cells 12 are closer in charge to one another as the cells 12 reach substantially charged states of charge and significant shunting is typically not needed to balance a significantly out of balance cell 12 with others of the cells 12 which are substantially charged (which may be a relatively slow process) and which may occur in arrangements which do not implement shunting during all of the operational states 142, 144, 146 of the cells 12 as discussed herein in one embodiment.

However, in some situations, one or more of the rechargeable battery cells 12 may be significantly out of balance with others of the cells 12 even in the presence of shunting during each of the operational states 142, 144, 146 of the cells 12. For example, a rechargeable cell module 41 which includes a defective rechargeable battery cell 12 may be removed from rechargeable battery module 40 and a replacement module 41 may be inserted which is significantly out of balance with respect to the other cells 12 of the module 40. In one embodiment, charge shuttling circuitry 64 may be used to transfer electrical energy between selected ones of the rechargeable battery cells 12, for example, to rapidly charge an out of balance cell 12 in one embodiment. The charge shuttling circuitry 64 may be used alone (e.g., if charge shunting circuitry 62 is omitted or not being used) or in combination with the shunting circuitry 62 in a hybrid arrangement or with other charge balancing circuitry in example embodiments.

In the illustrated embodiment, individual ones of the rechargeable cell modules 41 include charge shuttling circuitry 64 intermediate the negative terminal of the module 41 and the C terminal of the module 41 mentioned previously. As described below, the charge shuttling circuitry 64 is selectively enabled by the module controller to selectively couple one of the rechargeable battery cells 12 with the capacitor bus 42 at different moments in time to shuttle electrical energy between different ones of the rechargeable battery cells 12. The module controller may issue control signals via isolation circuitry 82 (e.g., optical, transformer coupling or Galvanic isolation) to control the operations of switches 80 to selectively couple the respective rechargeable battery cell 12 with the capacitor bus 46. Switches 80 are arranged to permit current flow in both directions through the charge shuttling circuitry 64 since alternating rechargeable battery cells 12 are reversed in direction with respect to the capacitor bus 42 as connected by the C terminals of the rechargeable cell modules 41 and electrical energy may be transferred to or from the respective cell 12 during shuttling operations. Although switches 80 are implemented as FETs in the depicted embodiment, the switches 80 may be implemented using alternative configurations, such as a single relay, in other embodiments. The control signals of the switches 80 may be pulse width modulated by the control circuitry 20 to provide a desired amount of current flow in one embodiment.

In one embodiment, only one of the rechargeable battery cells 12 is coupled with the capacitor bus 14 at a given moment in time to avoid shorting of the cells 12. The module controller is configured to monitor the states of charge of the rechargeable battery cells 12 of the respective rechargeable battery module 40. The module controller may control the shuttling circuitry 64 of appropriate ones of the rechargeable cell modules 41 to transfer electrical charge from one of the rechargeable battery cells 12 having a highest state of charge of the module 40 to the one of the rechargeable battery cells 12 having a lowest state of charge of the module 40 to shuttle electrical energy in one embodiment. Shuttling circuitry 64 may operate to shuttle the electrical energy during charging and/or discharging operations in different embodiments.

More specifically, in one embodiment, the module controller initially couples the rechargeable battery cell 12 having the highest state of charge with the capacitor bus 42 using the C terminal and switches 80 of the rechargeable cell module 41 containing the cell 12 having the highest state of charge and the C terminal and switches 80 of the adjacent module 41 which is coupled with the positive terminal of the module 41 which contains the cell 12 having the highest state of charge. The positive terminal of the rightmost rechargeable cell module 41 may be coupled directly with the capacitor module 48 while the negative terminal of the rightmost module 41 may be coupled with the capacitor bus 42 via its respective C terminal and switches 80 to enable the rightmost module 41 to transfer electrical energy with respect to the capacitor module 48 in the disclosed example embodiment.

Electrical energy from the highest cell 12 is transferred to and stored within the capacitor module 48 as described below in one embodiment. Thereafter, the rechargeable battery cell 12 is de-coupled from the capacitor bus 42 after the transfer of the charge to the capacitor module 48 by disabling the C terminals.

Following the de-coupling of the initial rechargeable battery cell 12, the rechargeable battery cell 12 having the lowest state of charge of the module 40 is coupled with the capacitor bus 42 to receive the electrical energy stored within the capacitor module 48 using the C terminal and switches 80 of the rechargeable cell module 41 containing the cell 12 having the lowest state of charge and the C terminal and switches 80 of the adjacent module 41 coupled with the positive terminal of the module 41 which contains the cell 12 having the lowest state of charge. The electrical energy is transferred from the capacitor module 48 to the cell 12 to increase the state of charge of the cell 12.

The result of the charge shuttling operations is to increase the state of charge of the rechargeable battery cell 12 having the lowest state of charge while decreasing the state of charge of the rechargeable battery cell 12 having the highest state of charge thereby increasing the balancing of the states of charge of the two cells 12. The charge shuttling operations may be continually performed during different operational states 142, 144, 146 of the rechargeable battery cells 12 during charging and discharging modes of operation. The charge shuttling operations operate to balance the states of charge of one or more of the rechargeable battery cells 12 which are significantly out of balance with others of the cells 12 in a manner which is faster and more efficient than use of the shunting circuitry 62, for example. Furthermore, the capacitor modules 48 may also transfer and/or receive electrical energy with respect to other capacitor modules 48 of other rechargeable battery modules 40 as described further below in some embodiments.

In one embodiment discussed above, shunting operations may be suspended if a temperature of the shunting circuitry 62 exceeds a threshold. However, charge shuttling operations may continue to be implemented with respect to cells 12 (e.g., shuttling charge between cells 12 having the highest and lowest states of charge) while shunting operations are disabled with respect to one or more of the cells 12 having an out-of-range temperature condition. In one specific embodiment, shuttling may be implemented with respect to a cell 12 whose shunting circuitry 62 has been disabled.

Accordingly, in one embodiment, the module controller may control the shuttling circuitry 64 to couple appropriate ones of the rechargeable battery cells 12 with the capacitor bus 42 at different moments in time. The coupled rechargeable battery cell 12 either transfers electrical energy to the capacitor module 48 or receives electrical energy from the capacitor module 48 in one embodiment.

Referring to FIG. 7, an example embodiment of a capacitor module 48 of one of the rechargeable battery modules 40 is shown. Other embodiments are possible including more, less and/or alternative components.

Capacitor module 48 includes a module controller 120 which is a part of control circuitry 20 in the described example embodiment. Capacitor module 48 may be considered to be a battery hub interfacing with the rechargeable cells modules 41 of the respective rechargeable battery module 40 as well as the system controller 21 in one embodiment. In addition, capacitor module 48 may also provide voltage monitoring of the rechargeable battery cells 12 of the respective module 40 and control charging of storage circuitry 90 of the respective module 40 to implement charge shuttling operations described below. Capacitor module 40 may also be used to provide parallel to serial conversion of switch and temperature control and data signals which control switches and monitor temperatures of the respective rechargeable battery modules 40 and for communications with system controller 21 in one embodiment. Capacitor modules 48 of the rechargeable battery modules 40 may also be used to couple a plurality of the rechargeable battery modules 40 together, for example to implement large scale balancing (see FIG. 8) in one embodiment.

Accordingly, module controller 120 is configured to monitor and control various operations of the rechargeable battery module 40 including monitoring and controlling operations of the rechargeable cell modules 41 and capacitor module 48 of the rechargeable battery module 40 in one embodiment. For example, in the illustrated embodiment, module controller 120 may be configured to control the shuttling circuitry 64 resident in the capacitor module 48 as well as control the shuttling circuitry 64 of the individual rechargeable cell modules 41 (e.g., control the operations of switches 80 to selectively couple appropriate rechargeable battery cells 12 with the capacitor bus 42). In addition, the module controller 120 may control the shunting operations of the shunting circuitry 62 based upon states of charge of the cells 12 (e.g., control the switches 70 to selectively shunt charging electrical energy around respective ones of the rechargeable battery cells 12).

Module controller 120 is also configured to monitor temperatures of the rechargeable battery cells 12 via respective temperature sensors 66 and to monitor temperatures of the shunting circuitry 62 via the respective temperature sensors 76. Module controller 120 is also configured to monitor voltages (and the states of charge) of rechargeable battery cells 12 as described further below.

As mentioned above, module controller 120 is also configured to communicate with system controller 21 in one embodiment. System controller 21 may monitor states of charge of the rechargeable battery cells 12 of the respective rechargeable battery module 40 via communications with module controller 120 and also issue control signals to control operations of module controller 120 (e.g., large scale balancing operations) in one embodiment.

Module controller 120 may have appropriate memory 122 which contains programming for execution by module controller 120, data storage, etc. In one embodiment, memory 122 includes calibration information for factory calibrating the voltage monitoring due to component value errors.

In the illustrated embodiment, capacitor module 48 includes a portion of charge shuttling circuitry 64 in the form of storage circuitry 90 including plural storage devices 92 (e.g., capacitors) in one example. Storage devices 92 are configured to store electrical energy received from one of the rechargeable cell modules 41 via capacitor bus 42 and to provide the electrical energy to another of the rechargeable cell modules 41 via capacitor bus 42 to implement charge shuttling operations in one embodiment.

Module controller 120 is coupled with a switch control 100 in one embodiment to control various operations of capacitor module 48. Module controller 120 may control switches 94, 99 to couple the capacitor module 48 with different capacitor buses 42 of the rechargeable battery modules 41 in one embodiment. Module controller 120 may control switches 95, 98 to control the polarity of the coupling of a rechargeable battery cell 12 with the capacitor bus 42 in one embodiment based upon the polarity of the coupling of the rechargeable battery cell 12 with the capacitor bus 42 via the switches 80 and C terminals of the individual rechargeable cell modules 41 in one embodiment. Switch 97 may be controlled to decouple storage circuitry 90 from capacitor bus 42 of the module 40 to permit monitoring of voltages of cells 12 using voltage monitoring circuitry 102 as described below in one embodiment.

Capacitor module 48 is also coupled with a positive terminal of rechargeable battery module 40 in one embodiment. Module controller 120 may selectively control a switch 110 via appropriate isolation circuitry 124 (e.g., optical, transformer coupling or Galvanic isolation) to selectively couple the positive terminal 50 with the storage circuitry 90 via a connector 112, for example, to receive or provide electrical energy with respect to the rightmost one of the rechargeable battery modules 41 of FIG. 3 during charge shuttling operations in one embodiment.

In one embodiment, capacitor module 48 includes a voltage multiplication circuit which is configured to receive electrical energy from one of the cells 12 at a first voltage, to increase the voltage of the electrical energy and to transfer the electrical energy having the increased voltage to another of the modules 41.

More specifically, a cross-over switch 96 is utilized to couple the storage devices 92 in parallel or in series with one another with respect to capacitor bus 42 in one embodiment.

The control of the parallel or series coupling selectively provides a voltage multiplication circuit (e.g., voltage doubler) during charge shuttling operations in one embodiment. For example, even though two rechargeable battery cells 12 may have different states of charge, they may have similar voltages (e.g., if both cells 12 are in the intermediate state of charge 144). Charge shuttling circuitry 64 is configured to implement a voltage doubling function in the described embodiment to control the flow of electrical energy from the rechargeable battery cell 12 having the higher state of charge to the cell 12 having the lower state of charge. The arrangement enables relatively high current flow between the cells 12 even though the cells 12 have similar voltages as discussed further below.

In one embodiment, module controller 120 controls the crossover switch 96 to couple the storage devices 92 in parallel with one another when electrical energy is received from the one of the rechargeable battery cells 12 having the higher state of charge. Thereafter, the storage devices 92 are coupled in series with one another to increase the voltage of the stored electrical energy to cause the electrical energy to flow to the one of the rechargeable battery cells 12 coupled with capacitor bus 42 having the lower state of charge. Storage circuitry 90 may be coupled with a resistive load 91 to limit currents flowing into and out of storage circuitry 90 in one embodiment.

This described example arrangement may provide increased current flow during charge shuttling operations from the cell 12 having the higher state of charge to the cell 12 having the lower state of charge compared with arrangements which do not use voltage multiplication circuitry. More specifically, current flow between cells 12 is reduced as the voltage potential difference between the cells 12 decreases. However, the voltage multiplication circuitry of one embodiment of the disclosure provides an increased voltage potential difference which provides increased current flow during charge shuttling operations between the cells 12 (even if the cells 12 have substantially the same voltage without the multiplication) compared with arrangements which do not utilize the described voltage multiplication.

Capacitor module 48 is also configured to implement voltage monitoring operations of the rechargeable battery cells 12 via voltage monitoring circuitry 102 in one embodiment. Module controller 120 may determine state of charge information using the determined voltages of the rechargeable battery cells 12 in one embodiment.

Module controller 120 may control switch 108 to selectively couple a capacitor 104 in parallel with the capacitor bus 42 to monitor a voltage of the cell 12 of one of the modules 41 which is also coupled with the capacitor bus 42 in example embodiments. Module controller 120 may monitor voltages of individual ones of the rechargeable battery cells 12 coupled with capacitor bus 42 at different moments in time via the capacitor 104 and interface circuitry 106 to determine the states of charge of the cells 12 in one embodiment. Switches of the storage circuitry 90 and switch 97 may be opened to de-couple storage devices 92 from the capacitor bus 42 while voltage monitoring operations are performed in one embodiment. Voltage monitoring circuitry 102 may also be used to monitor voltages of the storage devices 92 with the cells 12 de-coupled from the capacitor bus 42 in one embodiment.

Any suitable method may be used to calculate the states of charge of the cells 12. In one embodiment, information from current sensor 31 and the voltages of the rechargeable battery cells 12 may be used to determine the states of charge of the rechargeable battery cells 12. System controller 21 or module controllers 120 may calculate the states of charge of the cells 12 in one embodiment. In one example, control circuitry 20 may employ Coulomb counting using current information from sensor 31 (FIG. 2). Furthermore, monitored temperature information of the cells 12 may be used in one embodiment to cancel out temperature effects on the battery system 10 to assist with the determination of the states of charge. Other suitable methods such as monitoring consumed power from the cells 12 may be used to calculate states of charge of the cells 12 in other embodiments.

During voltage monitoring of cells 12, operations of shunting circuitry 62 may be taken into account in one embodiment. For example, only a cell 12 which is not being shunted may be considered to be a lowest charged cell 12 while any of the cells may be considered to be a highest charged cell 12 in one implementation.

Referring to FIG. 8, one method of balancing rechargeable battery cells 12 using charge shuttling is shown. The illustrated example is performed with respect to two rechargeable battery modules 40 of a pack of the rechargeable battery cells 12 and the modules 40 each include four rechargeable battery cells A1-A4 and B1-B4 in the example of FIG. 8. In one embodiment, system controller 21 is configured to execute appropriate programming using information from individual module controllers 120 of the rechargeable battery modules 40 to implement the described balancing operations. Other methods are possible and additional modules 40 may be balanced in other embodiments.

The balancing operations proceed from the top downwards in the example of FIG. 8 and the top illustration depicts states of charge of the cells when balancing operations are initiated. The middle illustration depicts first balancing operations which are performed to balance the rechargeable battery cells of a given module 40 with respect to one another. As described below, one of the rechargeable battery cells of a module 40 is left out of balance with the other cells of the same module 12 as a result of the first balancing operations. Thereafter, the charge shuttling circuitry 64 may implement second balancing operations to balance the states of charge of plural modules 40 with respect to one another.

The charge balancing circuitry 64 is configured to implement, for individual ones of the rechargeable battery modules 40, the first charge balancing operations to increase the balancing of states of charge of the rechargeable battery cells of one of the rechargeable battery modules 40 compared with the states of charge of the rechargeable battery cells of the respective rechargeable battery modules 40 in an absence of the first charge balancing operations. The charge balancing circuitry 64 is also configured to implement the second charge balancing operations to increase the balancing of states of charge of the rechargeable battery modules 40 with respect to one another compared with the states of charge of the rechargeable battery modules 40 in an absence of the second charge balancing operations.

In the depicted example method, a global average 130 of state of charge may be determined based upon the states of charge of all of the cells of both of the rechargeable battery modules 40. In addition, local averages 132 of states of charge of the cells of respective individual modules 40 are also shown. The module 40 on the left has a local average 132 less than the global average 130 while the module 40 on the right has a local average 132 greater than the global average 130.

Referring to the middle illustration of FIG. 8, the example first balancing operations balance all of the cells of an individual rechargeable battery module 40 except for one cell. If the local average 132 of the module 40 is less than the global average 132, then the module 40 can receive electrical energy from another module 40 of the pack and the method leaves one cell (A1) undercharged compared with the other cells (A2-A4) which are substantially balanced. If the local average 132 of the module 40 is greater than the global average 132, then the module 40 has excess electrical energy which may be transferred to another module 40 and the method leaves one cell (B1) overcharged compared with the other cells (B2-B4) which are substantially balanced. The above-described first charge balancing operations with respect to balancing cells in both modules 40 may be simultaneously performed prior to the second charge balancing operations in one embodiment.

Referring in further detail to the middle illustration of FIG. 8, electrical energy from the cell A3 which originally had the highest state of charge is shuttled to the other cells A1-A2 and A4 providing cells A2-A4 at the global average 130 while electrical energy is shuttled from cells B1 and B4 to cells B2 and 83 providing cells B2-B4 at the global average 130. The shuttling of the electrical energy leaves cell A1 with a state of charge less than the global average while leaving cell B1 with a state of charge greater than the global average.

Referring to the bottommost illustration in FIG. 8, electrical energy is shuttled from module B1 to module A1 during second balancing operations which reduces the state of charge of cell A1 while increasing the state of charge of module B1 and providing all of the cells of both of the modules 40 having substantially balanced states of charge at the global average 130. In one embodiment, the capacitor modules 48 of the appropriate modules 40 containing the cells A1-A4 and cells B1-B4 may transfer the electrical energy from the B1 cell to the A1 cell.

In one implementation, system controller 21 (FIG. 2) is configured to implement the example method described with respect to FIG. 8. The system controller 21 may access state of charge information regarding cells 12 of a plurality of modules 40 from respective module controllers 120, calculate local and global state of charge information, and may issue commands to the module controllers 120 to implement desired balancing operations, for example, based upon states of charge of the cells 12 of the modules 40 (e.g., using the local and global state of charge information in one embodiment). Furthermore, system controller 21 may communicate status information with respect to outside systems such as load 14.

As described herein, it is desired to avoid over-charging some types of rechargeable battery cells 12 and/or to avoid completely draining the cells 12. For example, if Lithium cells are used, overcharging or completely draining may damage the cells 12.

In one embodiment, charger circuitry 16 (FIGS. 1 and 2) may utilize a programmable power supply which may be controlled by control circuitry 20. In some embodiments, an amount of charging electrical energy applied from the charger circuitry 16 to the rechargeable battery cells 12 may be reduced as the states of charge of the cells 12 increase. In one embodiment, the control circuitry 20 may monitor voltages of the rechargeable battery cells 12 with respect to one or more thresholds as discussed above and may reduce an amount of current provided by the charger circuitry 16 as the voltages of the cells 12 exceed the thresholds indicating that the cells 12 are approaching a fully charged state. In one embodiment, the current may be dropped to a level which may be safely shunted using the shunting circuitry 62.

Different configurations of charger circuitry 16 are possible including voltage or current controlled chargers.

Control circuitry 20 may also monitor the charger circuitry 16 in some embodiments. For example, control circuitry 20 may monitor temperature during charging operations, and may control operations of the charger circuitry 16 to assure proper operation of the charger circuitry 16. In one example, if the temperature rises above an initial threshold, a fan or cooling system may be controlled in an attempt to reduce the temperature of the charger circuitry 16. If the temperature of the charger circuitry 16 reached a higher threshold, the control circuitry 20 may implement different operations, such as disabling charging functions until the operational temperature returns to a normal operational level.

Charge shuttling circuitry 64 may also be used during discharging operations of the pack of rechargeable battery cells 12 in an attempt to extract an increased amount of electrical energy from the cells 12 compared with arrangements which do not utilize charge shuttling operations. As mentioned above, it is desired to avoid completely draining some types of rechargeable battery cells 12 (e.g., Lithium cells). Furthermore, some configurations of cells 12 have different charge capacities, and accordingly, a cell 12 having a lower charge capacity may reach a minimum state of charge threshold which is provided to avoid damaging the cells 12 before others of the cells 12 having higher charge capacities during discharge operations. In one embodiment, charge shuttling circuitry 64 may be used to shuttle electrical energy from one of the rechargeable battery cells 12 having the highest state of charge to the cell 12 having the lowest state of charge before the cell 12 reaches the minimum state of charge threshold and thereby enabling additional electrical energy to be discharged from the pack of rechargeable battery cells 12 and increasing the efficiency of the consumption of the electrical energy in the pack of cells 12.

For some configurations of cells 12 (e.g., cells comprising Lithium), voltages of the cells 12 may rapidly decrease once the cells 12 are in the discharged state 142. Shuttling of electrical energy to the cell 12 having the lowest state of charge allows the battery system 10 to keep the cell 12 in the relatively flat intermediate state 144 and to maintain a higher total pack voltage over a longer period of time. Discharge operations may continue until the charge shuttling fails to maintain all of the cells 12 above the minimum state of charge threshold at which time discharge operations may be disabled to avoid damaging one or more of the cells 12 in one embodiment.

At least some embodiments of the disclosure provide improved utility compared with other battery system arrangements. For example, use of a hierarchy including control circuitry at different levels, such as the system controller and plural module controllers according to some embodiments, may provide improved cost savings for example by having an individual module controller 120 interfacing with a plurality of rechargeable cell modules 41. In some embodiments, a relatively large number of rechargeable cell modules 41 (e.g., 16 or 32) may be included within a single rechargeable battery module 40 and which communicate with a single module controller 120. The per-cell cost of a rechargeable battery module 40 can be determined by dividing by the number of rechargeable cell modules 41 included within the module 40.

Some arrangements of the disclosure provide include charge balancing circuits and/or methods to increase the balancing of the states of charge of the plural rechargeable battery cells. For example, as discussed above in some embodiments, the battery system may use shunting and/or shuttling operations in attempts to increase the balancing of the states of charge of the rechargeable battery cells in different operational situations of the battery system. In one example, shuttling of electrical energy with respect to one rechargeable battery cell which is significantly out of balance compared with others of the cells may decrease the time needed to balance the cells compared with an arrangement which uses a single balancing procedure, such as shunting.

Shunting may be used to attempt to provide relatively tight balancing between the majority of the cells during charging operations as discussed above. Some embodiments of the disclosure provide shunting balancing operations during a plurality of operational states of the rechargeable battery cells (e.g., Lithium cells). For example, shunting may be implemented when cells are substantially discharged, in an intermediate states of charge, or substantially discharged. This example method of balancing may provide the cells with states of charge which are closer together during the charging process compared with arrangements which only implement shunting at the end of the charging cycle of the cells when the cells are almost fully charged.

Some of the described embodiments may be implemented in modular arrangements which permit the apparatus and methods to be utilized in many different applications to provide operational energy to many different types of loads having different power requirements. These battery systems may be easily scaled to different applications. Furthermore, one or more module controllers may monitor and control operations with respect to a plurality of respective rechargeable battery cells. In some implementations, a higher level system control may monitor and control operations of individual ones of the module controllers as discussed herein.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A rechargeable battery system comprising:
a plurality of terminals;
a plurality of cell modules coupled with the terminals, and wherein each of the cell modules includes at least one rechargeable battery cell which is configured to store electrical energy;
a plurality of battery modules, each respective battery module including (i) a capacitor module and (ii) two or more cell modules of the plurality of cell modules electrically connected to the capacitor module of the respective battery module; and charge shuttling circuitry configured to:
electrically connect the capacitor module of each respective battery module to each of the two or more cell modules of the respective battery module to enable electrical energy to be transferred between the two or more cell modules of the respective battery module; and electrically connect the capacitor module of each respective battery module to the capacitor module of at least one other battery module to enable electrical energy to be transferred between the two or more cell modules of the respective battery module and the two or more cell modules of the at least one other battery module.

2. The system of claim 1, wherein the two or more cell modules of each of the plurality of battery modules are coupled in series with one another, and the battery modules are coupled in series with one another between the terminals of the rechargeable battery system.

3. The system of claim 1, wherein each respective cell module includes:
a plurality of module terminals coupled with the terminals of the rechargeable battery system and the at least one rechargeable battery cell of the respective cell module; and
a portion of the charge shuttling circuitry which is configured to electrically connect the at least one rechargeable battery cell to the capacitor module of the respective battery module to enable electrical energy to be transferred electrical energy with respect to the at least one rechargeable battery cell of the individual cell module.

4. The system of claim 3, wherein each of the cell modules includes a shunt device configured to shunt electrical energy around the at least one rechargeable battery cell of the individual cell module.

5. The system of claim 3, wherein each restive battery module includes a bus configured to transfer the electrical energy between the two or more cell modules of the respective battery module and to transfer the electrical energy between the two or more cell modules of the respective battery module and the two or more cell modules of the at least one other battery module.

6. The system of claim 5, wherein the portion of the charge shuttling circuitry of each respective cell module includes a switch configured to selectively couple one of the module terminals of the respective cell module with one of a plurality of bus terminals of the bus of the respective battery module.

7. The system of claim 6, wherein the plurality of bus terminals of the bus of the respective battery module includes a first bus terminal and a second bus terminal, and wherein the switch of a first cell module of the respective battery module is only coupled with the first bus terminal and the switch of a second cell module is only coupled with the second bus terminals.

8. The system of claim 5, wherein the capacitor module of each respective battery module forms a portion of the charge shuttling circuitry, the capacitor module of each respective battery module including storage circuitry coupled with the bus of the respective battery module, the storage circuitry being configured to store the transferred electrical energy during the transferring.

9. The system of claim 1, wherein each cell module of each respective battery module is configured to be removable and replaceable with respect to other cell modules of the respective battery module.

10. The system of claim 1, wherein the charge shuttling circuitry is configured to transfer the electrical energy the two or more cell modules of each respective battery module during transferring of electrical energy between the plurality of battery modules and a device which is external of the rechargeable battery system.

11. The system of claim 1, wherein the charge shuttling circuitry is configured to implement the transfers of electrical energy during transferring of electrical energy between the plurality of battery modules and a device which is external of the rechargeable battery system.

12. The system of claim 1, wherein the capacitor module of each respective battery module includes at least one storage device and at least one battery module switch operable to connect the at least one storage device to either (i) the two or more cell modules of the respective battery module or (ii) the capacitor module of the at least one other battery module.

13. The system of claim 12, further comprising at least one system bus terminal electrically connecting the capacitor module of two adjacent battery modules of the plurality of battery modules, and wherein each respective battery module includes a bus terminal electrically connecting the capacitor module of the respective battery module to the two or more cell modules of the respective battery module.

14. The system of claim 13, wherein the at least one battery module switch includes:
a first switch operable to electrically connect a first terminal of the at least one storage device to either (i) a positive terminal of the system bus terminal, or (ii) a positive terminal of the bus terminal of the respective battery module; and
the second switch operable to electrically connect a second terminal of the at least one storage device to either (i) a negative terminal of the system bus terminal, or (ii) a negative terminal of the bus terminal of the respective battery module.

15. The system of claim 1, wherein the capacitor module of each respective battery module includes at least one storage device and at least one polarity switch operable to alternate a polarity of the at least one storage device with respect to the two or more cell modules of the respective battery module.

16. The system of claim 15, wherein each respective battery module includes a positive bus terminal electrically connecting the capacitor module to a first portion of the two or more cell modules of the respective battery module, and a negative bus terminal electrically connecting the capacitor module to a second portion of the two or more cell modules of the respective battery module.

17. The system of claim 16, wherein the at least one polarity switch includes a first switch operable to electrically connect a first terminal of the at least one storage device to either the positive bus terminal or the negative bus terminal, and a second switch operable to electrically connect a second terminal of the at least one storage device to either the negative bus terminal or the positive bus terminal.

18. The system of claim 1, wherein the capacitor module of each respective battery module is configured to be electrically connected to the two or more cell modules of the at least one other battery module only via the capacitor module of the at least one other battery module.

19. The system of claim 1, wherein the capacitor module of each respective battery module includes at least one storage device, at least one polarity switch operable to alternate a polarity of the at least one storage device with respect to the two or more cell modules of the respective battery module, and at least one battery module switch operable to connect the at least one storage device to either (i) the two or more cell modules of the respective battery module or (ii) the capacitor module of the at least one other battery module.

* * * * *

UNITED STATES PATENT AND TRADEMARK OFFICE
CERTIFICATE OF CORRECTION

PATENT NO. : 11,616,375 B2
APPLICATION NO. : 17/153410
DATED : March 28, 2023
INVENTOR(S) : Peter Nysen It is certified that error appears in the above-identified patent and that said Letters Patent is hereby corrected as shown below:

In the Claims

At Column 19, Line 41 (Claim 5, Line 1), please delete "restive" and insert --respective-- therefor.

Signed and Sealed this
Twentieth Day of June, 2023

Katherine Kelly Vidal
*Director of the United States Patent and Trademark Office*